(12) United States Patent
Adolph et al.

(10) Patent No.: US 8,902,314 B2
(45) Date of Patent: Dec. 2, 2014

(54) TRANSCODING MPEG BITTSTREAMS FOR ADDING SUB-PICTURE CONTENT

(75) Inventors: Dirk Adolph, Ronnenberg (DE); Ralf Ostermann, Hannover (DE)

(73) Assignee: Thomson Licensing (FR)

( * ) Notice: Subject to any disclaimer, the term of this patent is extended or adjusted under 35 U.S.C. 154(b) by 1248 days.

(21) Appl. No.: 10/499,868

(22) PCT Filed: Dec. 14, 2002

(86) PCT No.: PCT/EP02/14268
§ 371 (c)(1),
(2), (4) Date: Jun. 23, 2004

(87) PCT Pub. No.: WO03/056833
PCT Pub. Date: Jul. 10, 2003

(65) Prior Publication Data
US 2005/0018770 A1 Jan. 27, 2005

(30) Foreign Application Priority Data
Dec. 28, 2001 (EP) .................................... 01131037

(51) Int. Cl.
*H04N 7/18* (2006.01)
(52) U.S. Cl.
USPC ........................................................ 348/149
(58) Field of Classification Search
CPC .......... H04N 5/775; H04N 21/440218; H04N 21/2389; H04N 21/43615; H04N 5/85; H04N 9/8063; H04N 9/8227
USPC ..................... 375/240.01–240.06, 240.12–16
See application file for complete search history.

(56) References Cited

U.S. PATENT DOCUMENTS

| | | | | |
|---|---|---|---|---|
| 5,633,683 A | * | 5/1997 | Rosengren et al. | 375/240.01 |
| 6,226,041 B1 | * | 5/2001 | Florencio et al. | 348/473 |
| 6,373,530 B1 | * | 4/2002 | Birks et al. | 348/584 |
| 6,437,787 B1 | * | 8/2002 | Wu | 345/519 |
| 6,490,324 B1 | * | 12/2002 | McDade et al. | 375/240.25 |
| 6,504,996 B1 | * | 1/2003 | Na et al. | 386/125 |
| 6,650,706 B2 | * | 11/2003 | Le Maguet | 375/240.12 |
| 6,724,981 B1 | | 4/2004 | Park et al. | |
| 6,757,333 B2 | * | 6/2004 | Saunders et al. | 375/240.26 |
| 6,775,467 B1 | * | 8/2004 | Su | 386/125 |
| 6,970,510 B1 | * | 11/2005 | Wee et al. | 375/240.2 |

FOREIGN PATENT DOCUMENTS

| | | |
|---|---|---|
| EP | 935395 | 8/1999 |
| EP | 977439 | 2/2000 |
| EP | 984633 | 3/2000 |

(Continued)

OTHER PUBLICATIONS

Search Report Dated Aug. 20, 2003.

*Primary Examiner* — Dave Czekaj
*Assistant Examiner* — Leron Beck
(74) *Attorney, Agent, or Firm* — Jack Schwartz and Associates, PLLC

(57) ABSTRACT

A DVD transport stream including a video and a sub-picture stream shall be transcoded to a broadcasting transport stream. For this a decoding-encoding-chain merging video and sub-picture into a single video bitstream to conserve the information of the sub-pictures although not in the broadcasting format reserved is provided. By performing a sub-picture macroblock analysis the transcoding can be controlled such that the motion estimation unit of a standard MPEG-2 encoder and/or the entire decoding loop within the encoder can be saved.

6 Claims, 5 Drawing Sheets

(56) References Cited

FOREIGN PATENT DOCUMENTS

Figure 1:
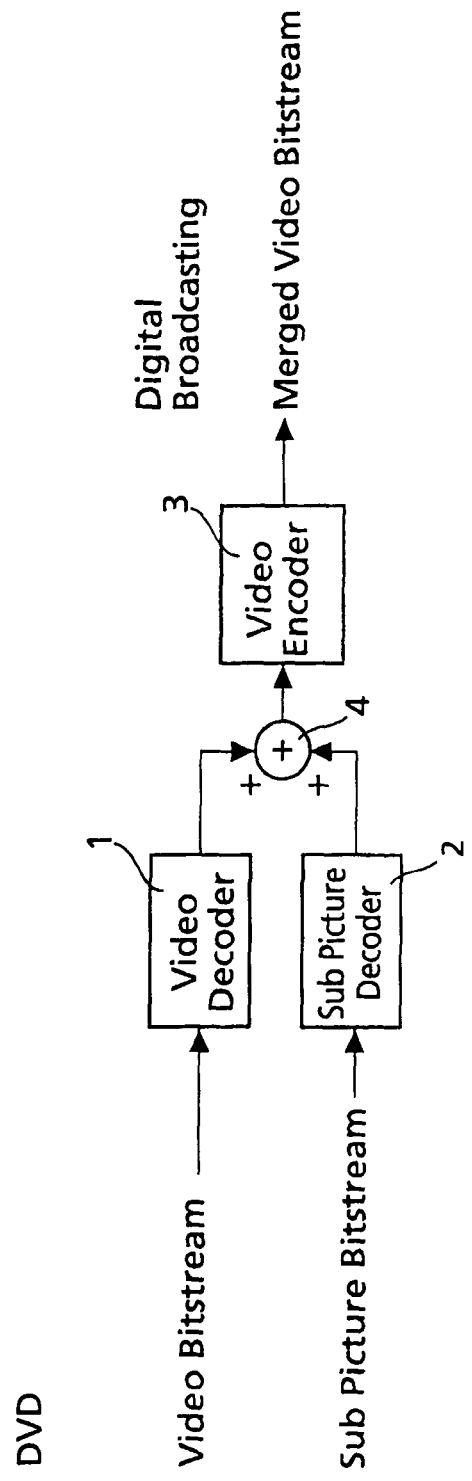

| | | |
|---|---|---|
| EP | 1148733 | 10/2001 |
| FR | 2786353 | 5/2000 |
| JP | 10145735 | 5/1998 |
| JP | 11289541 | 10/1999 |
| JP | 2000261802 | 9/2000 |
| WO | WO00/31979 | 6/2000 |

* cited by examiner

TRANSCODING MPEG BITTSTREAMS FOR ADDING SUB-PICTURE CONTENT

This application claims the benefit, under 35 U.S.C. §365 of International Application PCT/EP02/14268, filed Dec. 14, 2002, which was published in accordance with PCT Article 21(2) on Jul. 10, 2003 in English and which claims the benefit of European patent application No. 01131037.2, filed Dec. 28, 2001.

The present invention relates to a device and method for processing picture data signals including a video bitstream and a sub-picture bitstream. Particularly, the present invention relates to transcoding of a DVD transport stream into a digital broadcasting transport stream.

BACKGROUND

In some applications the conversion from a DVD transport stream into a digital broadcasting transport stream is required. In general a DVD transport stream contains three types of elementary bitstreams: video, audio and sub-picture bitstreams. However, a digital broadcasting transport stream like DSS, DVB or HD-TV does not contain such a sub-picture bitstream and when executing a one by one transcoding from the DVD format into a digital broadcasting format the DVD sub-picture bitstream is lost.

INVENTION

In conventional systems when transcoding a digital bitstream a complete decoding and encoding hardware is required. Furthermore, if the digital bitstream is decoded and converted to an analog signal, losses in quality are the consequence.

In view of that it is the object of the present invention to provide a method and a device for improving the transcoding of bitstreams.

According to the present invention this object is solved by a method for processing picture data signals including a video bitstream and a sub-picture bitstream, digitally decoding said video and sub-picture bitstream, digitally processing said decoded bitstreams and digitally encoding said processed bitstream or bitstreams.

Furthermore, the above-mentioned object is solved by a device for processing picture data signals including a video bit-stream and a sub-picture bitstream, with decoding means for digitally decoding said video and sub-picture bitstream, processing means for digitally processing said decoded bitstreams and encoding means for digitally encoding said processed bitstream or bitstreams.

Further favourable developments of the inventive method and device are defined in the sub-claims.

When the transcoding of a DVD transport stream into a digital broadcasting transport stream like DVB, DSS or HD-TV is executed the elementary sub-picture bitstream available in the DVD stream cannot be placed in the broadcasting transport stream.

The solution for keeping the sub-picture information available in the digital broadcasting transport bitstream is to merge video and sub-picture into a single video bitstream. The merged video bitstream—containing video and sub-picture—can be placed into the digital broadcasting transport stream again.

The merging of sub-picture and video bitstream requires a chain of two decoders, one for sub-picture and one for video, and a single encoder for the merged video. By using the invention described here for encoding the merged video the encoder hardware can drastically be simplified. In a first step the complex motion estimation hardware can be saved. By further limiting the encoded macroblock type to intra encoded macroblocks only even the whole decoding loop of the encoder can be taken away.

The encoder may have a special control unit, taking over unchanged all macroblocks in the pictures of the video which are not affected from the sub-picture, i.e. which remain unchanged after merging with the sub-picture. For all macroblocks in the pictures in which the original video has been affected by the sub-picture content, the control unit switches to a new encoding operation.

The new encoding might be a zero vector prediction encoding or an intra encoding. Both modes do not need any motion estimation and make the motion estimation hardware obsolete for this application. By abstain of using the null vector prediction mode for the affected macroblocks in the picture and using the intra mode only even the prediction hardware can be economized, i.e. the decoding loop is saved.

Thus, the invention described here gives an economical solution for decoding the DVD transport bitstream and encoding an overlay of video and sub-picture data into a new single video bitstream. By using the invention the newly encoding saves the motion estimation unit usually necessary for an MPEG encoding hardware.

DRAWINGS

Figure 2:
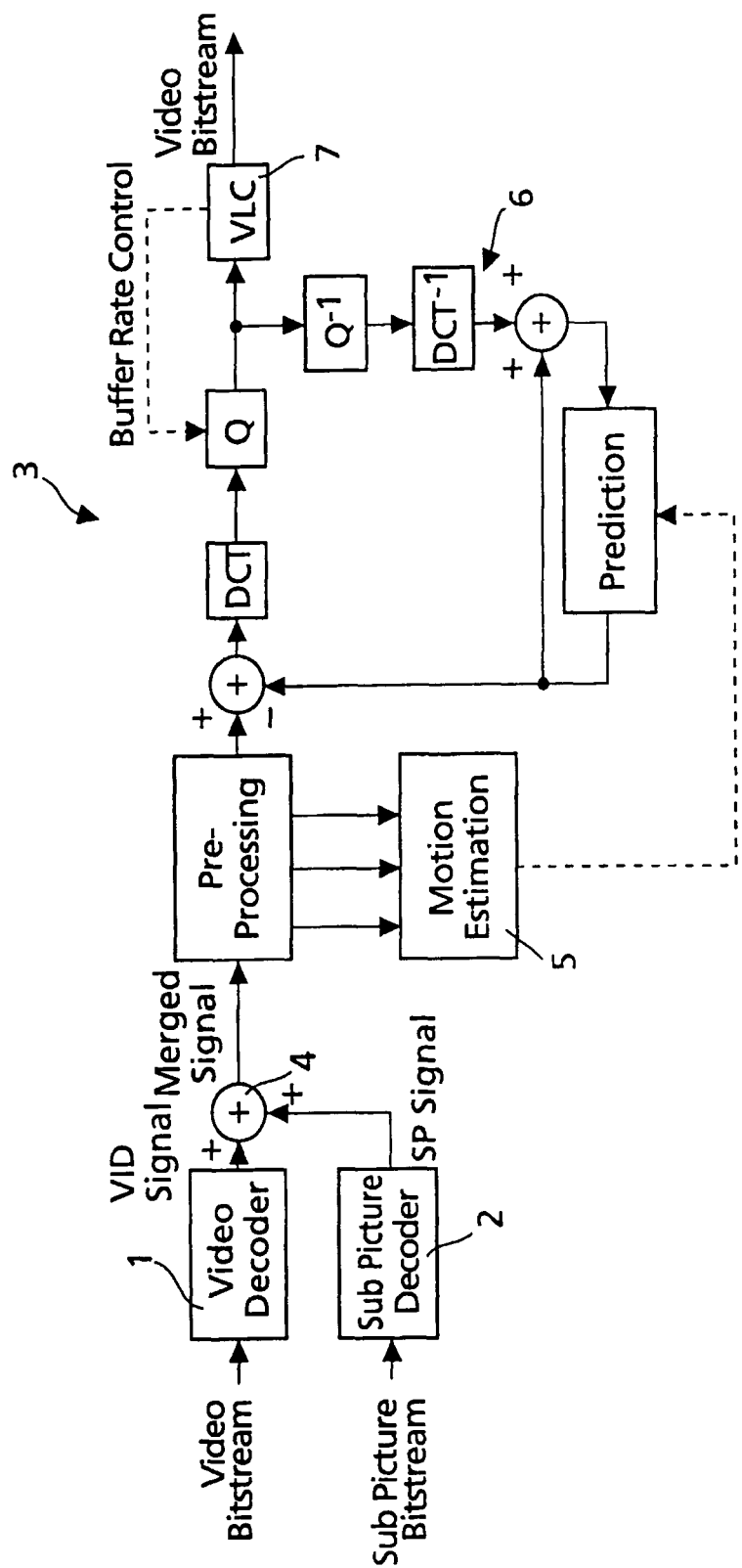
Figure 3:
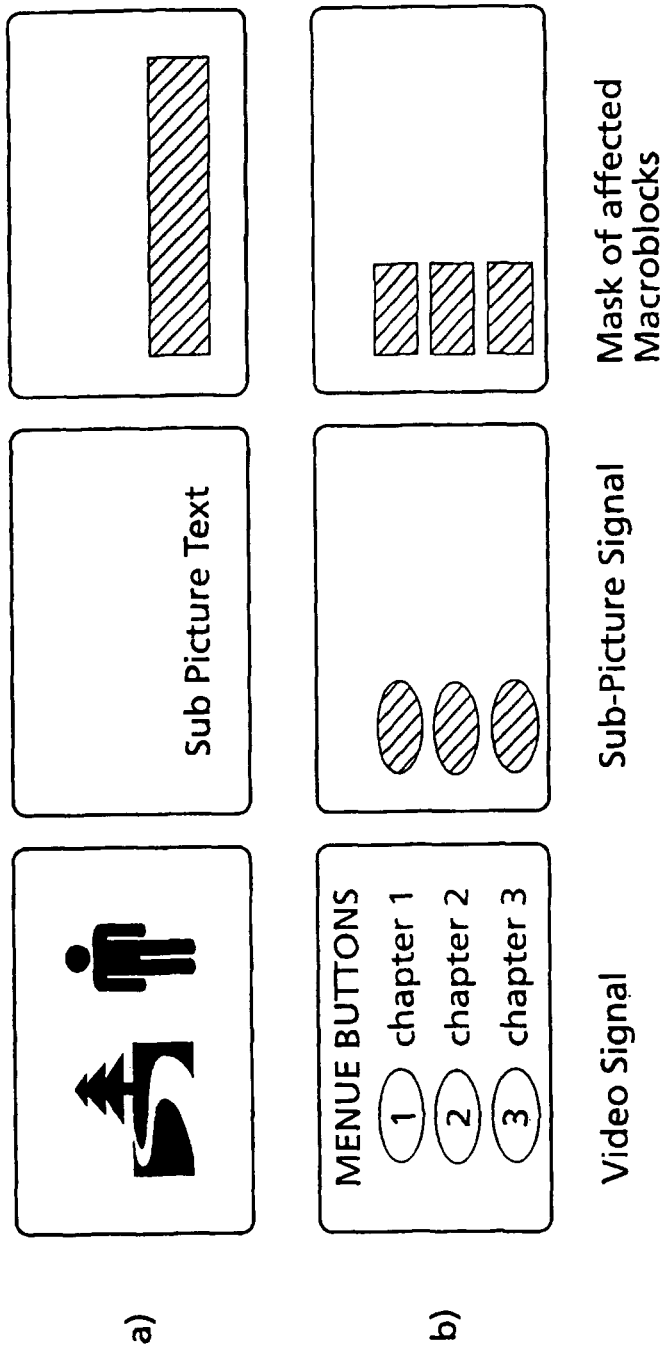
Figure 4:
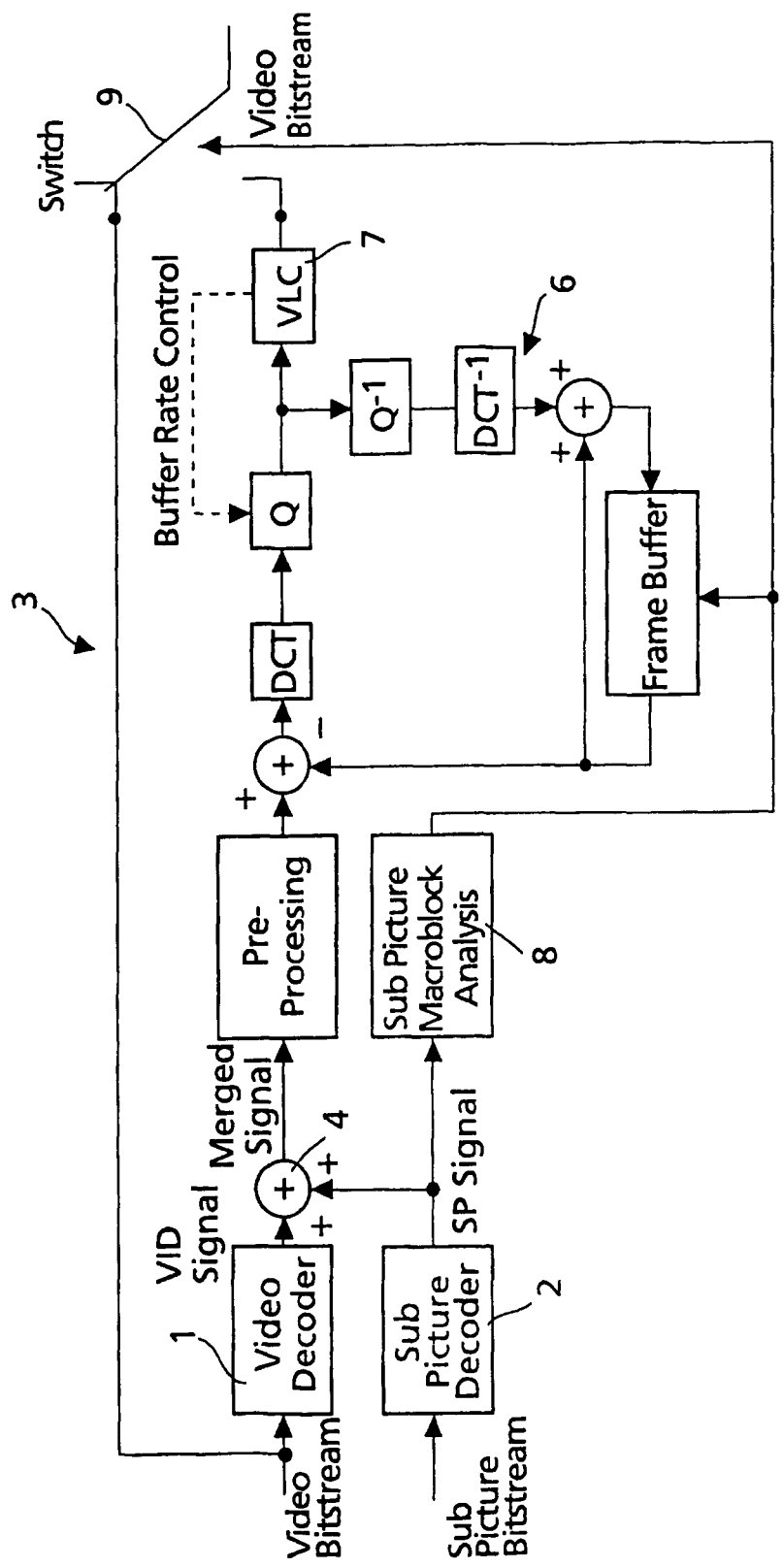
Figure 5:
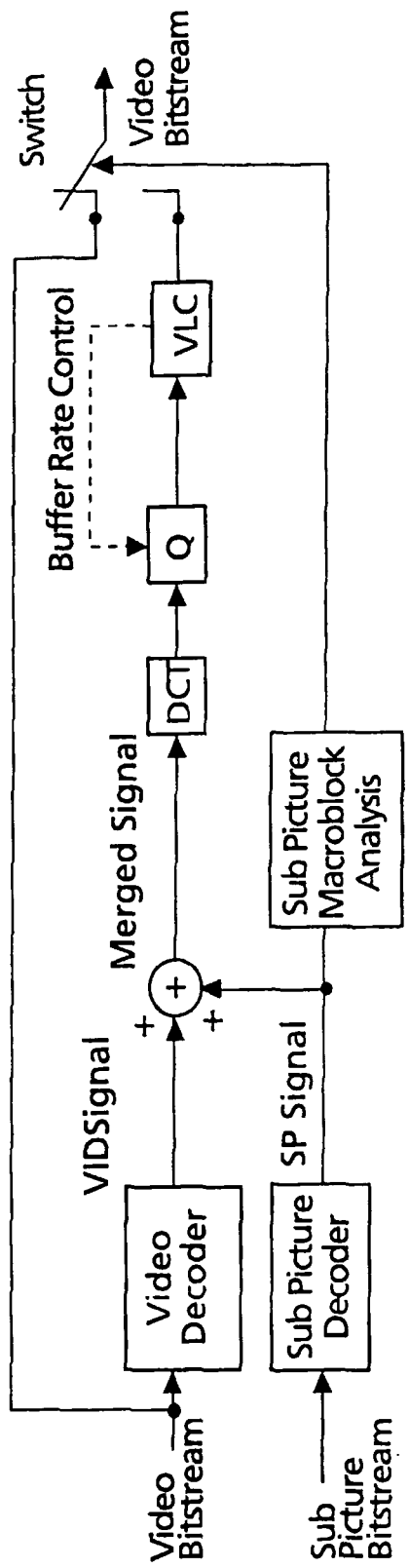

The present invention will now be described in more detail in connection with the attached drawings showing in:

FIG. 1 a principle block diagram of a decoder-encoder-chain;

FIG. 2 details of the decoder-encoder-chain for merging sub-picture signal and video signal according to the present invention;

FIG. 3 two examples of video signals, sub-picture signals and the masks of affected macroblocks;

FIG. 4 a decoder-encoder-chain for merging a sub-picture signal and video signal using intra or zero vector prediction macroblock types based on sub-picture macroblock analysis; and FIG. 5 a decoder-encoder-chain for merging a sub-picture signal and video signal using only intra macroblock types based on sub-picture macroblock analysis.

EXEMPLARY EMBODIMENTS

When a DVD transport stream is fed to a DSS, DVB or HDTV receiver it needs to be converted first to fit in the corresponding transport stream data frame. The DVD transport bitstream very often contains a sub-picture bitstream. A sub-picture bitstream contains e.g. subtitles in a certain language for the dialogues of a movie. The customer may want to see the sub-titles on screen. Unfortunately the broadcasting transport stream does not provide any entry for a sub-picture bitstream and the sub-picture bitstream also is not intended to be decoded by the corresponding hardware even when it would be embedded as a private bitstream. If the sub-picture bitstream has to become visible within a broadcasting decoder it has to be merged with the original video bitstream and re-encoded into a merged video bitstream during a cross encoding process.

A merging of sub-picture and video bitstream used in DVD applications into a new merged video bitstream used for digital broadcasting requires a chain of two decoders 1, 2 and a single encoder 3 (see FIG. 1).

The video bitstream is decoded by the video decoder 1 to a video signal (VID signal) and the sub-picture bitstream is decoded by the sub-picture decoder 2 to a sub-picture signal (SP signal). The video signal and the sub-picture signal are added by an adder 4 to obtain a merged signal. The merged signal is encoded by the video encoder 3 to a merged video bitstream as used in digital broadcasting.

The invention primarily can be used in studios of broadcasting stations. A particular interest in using the invention have the studios of video on demand service providers. Here the individual customer may select the sub-title insertion in a specified language and the VOD service provider delivers the transcoded bitstream with the integrated sub-titels.

FIG. 2 shows the video encoder 3 in more detail. Since the depicted encoder 3 is a standard MPEG-2 encoder it is referred to the MPEG-2 standard for detailed description.

A complete MPEG video encoder usually is very complex as it contains a motion estimation unit 5 and a decoding loop 6 besides the encoding hardware 7 (see FIG. 2). By using the invention described here for encoding the merged video the encoder hardware 3 can drastically be simplified according to the following embodiments.

As a prerequisite for simplifying the encoding hardware for the generation of a merged video bitstream it is necessary to execute a sub-picture macroblock analysis (see FIG. 3). The macroblock analysis generates a macroblock mask (in luma and chroma) containing all the macroblocks in the picture where a sub-picture or a part of it is located. FIG. 3 shows two examples of video signals, sub-picture signals and masks of affected macroblocks. In case a) the video signal corresponds to a conventional picture. The sub-picture signal corresponds to a usual sub-title text. The macroblocks affected by the sub-title lead to a mask shown on the right side of FIG. 3 with rectangular form.

In case b) the video signal corresponds to a typical menue known from computer applications. In this case the sub-picture signal represents a graphic corresponding to a button of the menue. The macroblocks affected by the graphical sub-picture button result in a mask in the form of a little rectangle. Only these elements of a frame which are not masked (hatched areas in the right frames of FIG. 3) have to be processed for transcoding, whereas the other parts of the frame being masked can be left unchanged.

By using the mask of affected macroblocks (MAM), generated from the sub-picture macroblock analysis, in a first step the complex motion estimation hardware can be saved (see FIG. 4). The encoder 3 uses a special control unit 8 based upon the MAM, by copying all macroblocks unchanged into the output bitstream (see switch 9 in FIG. 4) which are not affected by the sub-picture, i.e. which remain unchanged after merging with the sub-picture. For all macroblocks in the pictures in which the original video content has been affected by the sub-picture content, the MAM-control unit switches for a new encoding. The encoding process is using all macroblock types I, P, B possible within MPEG but all motion vectors, if used for a new encoding, are set to zero. Therefore, the complex motion estimation can be left out.

A further simplification of the encoder hardware is possible by limiting the encoded macroblock type to intra macroblocks only. When this is done even the whole decoding loop 6 of the encoder 3 can be taken away as depicted in FIG. 5. Again the MAM-control unit 8 is controlling the encoding process based upon the MAM generated from the sub-picture bitstream. Parts of the bitstream not affected by the re-encoding are passing the encoding process unchanged. All other macroblocks are re-encoded as intra macroblocks. Besides the motion estimation unit 5 this encoding hardware saves the whole decoding loop 6, i.e. also the frame buffers can be taken away.

The invention described here gives an economical solution for decoding the DVD transport bitstream and encoding video together with sub-picture into a new single video bitstream.

In summary, the present invention enables:
1) Generation of a macroblock mask by determining the active macroblocks out of the sub-picture bitstream.
2) Re-encoding a merged video and sub-picture bitstream by using the mask knowledge generated by means of the sub-picture information.
3) Re-encoding a merged video and sub-picture bitstream by limiting all motion compensated macroblock types to zero motion vectors.
4) Re-encoding a merged video and sub-picture bitstream by limiting all macroblock types to intra encoded (I-type).
5) Generation of a new video bitstream by merging video and sub-picture data into a new bitstream.

Another field of application of the invention is the distribution of video content in a home network. E.g. a home network based on the IEEE1394 bus is capable of delivering an MPEG2 transport stream in IEEE1394 bus packets. With the invention it is possible to generate the transcoded MPEG2 TS in a DVD player and transfer it over the IEEE1394 bus to any device having an MPEG2 decoder. This can be a set top box, a personal computer, a digital video recorder, a digital TV set etc. The MPEG2 decoder delivers the decoded video content to the display device it is connected with. This can be a TV set, computer monitor and the like. The subtitles will thus occur on the screen of the display device.

The invention claimed is:

1. Method for transcoding a picture data signal that includes a video bitstream and a DVD sub-picture bitstream into a single video bitstream, the method comprising, digitally decoding said DVD sub-picture bitstream into a DVD sub-picture signal, extracting from the DVD sub-picture signal a macroblock mask containing as affected macroblocks all those macroblocks that will be affected by the DVD sub-picture, generating, only in the affected macroblocks, newly encoded video data by decoding the video bitstream into a video signal, adding the video signal and the DVD sub-picture signal into a merged signal, and re-encoding the merged signal using intra macroblock type or zero vector prediction macroblock type, and generating a single video bitstream including unaltered encoded video data from the video bitstream in macroblocks other than the affected macroblocks, and including the re-encoded merged signal in the affected macroblocks.

2. Method according to claim 1, wherein the merged bitstream is a MPEG2 transport stream and the transport packets are delivered in bus packets over a bus connection of a home network to a device being equipped with MPEG2 decoder.

3. Method according to claim 2, wherein the bus of the home network is the IEEE1394 bus.

4. Device for transcoding a picture data signal that includes a video bitstream and a DVD sub-picture bitstream into a single video bitstream, the device comprising first and second decoders for digitally decoding said video bitstream and said DVD sub-picture bitstream into a video signal and a DVD sub-picture signal, respectively; a sub-picture macroblock analysis for generating a macroblock mask containing as affected macroblocks all those macroblocks that will be affected by the DVD sub-picture; an adder for merging, in the affected macroblocks, the video signal and the DVD sub-picture signal, an encoder for digitally encoding, in the affected macroblocks, said merged video and DVD sub-picture signals using intra macroblock type or zero vector prediction macroblock type, and a controller for generating said single video bitstream by including unaltered encoded video data from said video bitstream in macroblocks other than said affected macroblocks and including the re-encoded merged signal in said affected macroblocks.

5. Device according to claim 4, wherein the merged bitstream is a MPEG2 transport stream and the device comprises means for delivering the MPEG2 transport packets in bus packets for a bus connection of a home network.

6. Device according to claim 5, wherein the means for delivering the MPEG2 transport packets in bus packets are included in a IEEE1394 bus interface.

* * * * *